(12) United States Patent
Jeong et al.

(10) Patent No.: US 12,717,536 B2
(45) Date of Patent: Aug. 25, 2026

(54) DISPLAY DEVICE FOR CONTROLLING MULTIPLE DEVICES WITH ONE CONTROLLER AND METHOD FOR OPERATING THE SAME

(71) Applicant: SAMSUNG ELECTRONICS CO., LTD., Suwon-si (KR)

(72) Inventors: Jaehyeong Jeong, Suwon-si (KR); Minsang Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/297,751

(22) Filed: Aug. 12, 2025

(65) Prior Publication Data

US 2026/0111163 A1 Apr. 23, 2026

Related U.S. Application Data

(63) Continuation of application No. PCT/KR2025/011925, filed on Aug. 7, 2025.

(30) Foreign Application Priority Data

Oct. 18, 2024 (KR) ........................ 10-2024-0143002

(51) Int. Cl.
*G06F 3/14* (2006.01)
*G08C 23/04* (2006.01)

(52) U.S. Cl.
CPC ........... *G06F 3/1423* (2013.01); *G08C 23/04* (2013.01)

(58) Field of Classification Search
CPC .... G08C 23/04; G08C 2201/40; G06F 3/1423
See application file for complete search history.

(56) References Cited

U.S. PATENT DOCUMENTS 9,407,949 B2 8/2016 Kim
12,301,915 B2 5/2025 Lee et al.
(Continued)

FOREIGN PATENT DOCUMENTS

CN 104378673 B 12/2018
KP 10-2022-0005902 A 1/2022
(Continued)

OTHER PUBLICATIONS

Communication dated Nov. 12, 2025, issued by the International Searching Authority in International Application No. PCT/KR2025/011925 (PCT/ISA/210 and PCT/ISA/237).

*Primary Examiner* — Deeprose Subedi
(74) *Attorney, Agent, or Firm* — Sughrue Mion, PLLC

(57) ABSTRACT

A display device configured to detect a wireless connection to a high-definition multimedia interface (HDMI) connection device connected to an external source device, determine a first distance to the HDMI connection device based on a time difference between a first time point of the wireless connection to the HDMI connection device and a second time point of reception of the first IR signal, based on the first distance being within a determined IR signal arrival range, set the IR signal transceiver as an IR signal output device for the external source device, determine whether a second IR signal output by the IR signal transceiver at least partially overlaps a third IR signal transmitted through the HDMI connection device, and, based on determining that the second IR signal does not overlap the third IR signal, set the HDMI connection device as the IR signal output device for the external source device.

20 Claims, 10 Drawing Sheets

(56) References Cited

U.S. PATENT DOCUMENTS

| | | | | |
|---|---|---|---|---|
| 2012/0075082 | A1* | 3/2012 | Rothkopf | G08C 19/28 348/E5.09 |
| 2013/0057465 | A1 | 3/2013 | Lee et al. | |
| 2017/0134685 | A1 | 5/2017 | Jung | |
| 2019/0043345 | A1 | 2/2019 | Owrang et al. | |
| 2020/0273323 | A1 | 8/2020 | Kim et al. | |
| 2020/0273432 | A1* | 8/2020 | Kobayashi | G09G 5/38 |
| 2020/0363852 | A1 | 11/2020 | Choi | |
| 2022/0353347 | A1 | 11/2022 | Einaudi et al. | |
| 2023/0154439 | A1 | 5/2023 | Yi et al. | |

FOREIGN PATENT DOCUMENTS

| | | | |
|---|---|---|---|
| KR | 10-2013-0026234 | A | 3/2013 |
| KR | 10 2017 0053269 | A | 5/2017 |
| KR | 10-1789225 | B1 | 11/2017 |
| KR | 10 2019 0041067 | A | 4/2019 |
| KR | 10 2020 0132238 | A | 11/2020 |
| KR | 10-2022-0129021 | A | 9/2022 |

* cited by examiner

DISPLAY DEVICE FOR CONTROLLING MULTIPLE DEVICES WITH ONE CONTROLLER AND METHOD FOR OPERATING THE SAME

CROSS-REFERENCE TO RELATED APPLICATIONS

This application is a continuation application of International Application No. PCT/KR2025/011925, filed on Aug. 7, 2025, which claims priority to Korean Patent Application No. 10-2024-0143002, filed on Oct. 18, 2024, in the Korean Intellectual Property Office, the disclosures of which are incorporated by reference herein in their entireties.

BACKGROUND

1. Field

The present disclosure relates generally to display devices, and more particularly, to a display device that controls a plurality of devices with a single controller and a method for operating the same.

2. Description of Related Art

Recent advancements in wireless communication technologies may provide for a gradual transition of various home appliances from wired connection methods to wireless connection methods. For example, Wireless-Fidelity (Wi-Fi) technology may be a wireless communication technology that may be typically used in a home network environment. Early implementations of Wi-Fi may have been limited by speed and/or signal strength. However, more recent implementations, such as, but not limited to, Wi-Fi 6 and 6e, may provide faster speeds, wider ranges, and/or simultaneous access to many devices, when compared to the early implementations. Consequently, home appliances, such as, but not limited to, televisions (TVs), refrigerators, air conditioners, washers, or the like, may be able to operate, using such recent implementations, within a relatively stable wireless network environment, which may facilitate seamless communication between devices throughout the home without the need for complex wired connections. Further, the development of short-range wireless communication such as, but not limited to, Bluetooth™ may further accelerate access to wireless connectivity within a home environment. Initially, Bluetooth™ may have been typically utilized for establishing connections to audio devices and/or peripheral devices (e.g., keyboards, mice, or the like). However, recent advances in Bluetooth™ technology (e.g., Bluetooth 5.0 and subsequent versions) may provide for relatively wider ranges and/or relatively more stable data transfers. As a result, for example, Internet of Things (IoT) devices may utilize such wireless connections to connect with each other, which may provide users with the ability to control multiple home appliances via mobile devices (e.g., user equipment (UE), smart phones, or the like) or voice commands.

SUMMARY

According to an aspect of the present disclosure, a display device includes a display, a wireless communication circuit, an infrared (IR) signal transceiver, one or more processors including processing circuitry, and memory storing at least one program. The at least one program, when executed by the one or more processors individually or collectively, causes the display device to detect, using the wireless communication circuit, a wireless connection to a high-definition multimedia interface (HDMI) connection device, based on receiving a first IR signal from the HDMI connection device through the IR signal transceiver within a predetermined wait time, determine a first distance to the HDMI connection device based on a time difference between a first time point corresponding to the wireless connection to the HDMI connection device and a second time point corresponding to reception of the first IR signal, based on the first distance being within a determined IR signal arrival range, set the IR signal transceiver as an IR signal output device for the external source device, based on the first distance and a performance of a wireless communication network, determine whether a second IR signal output by the IR signal transceiver at least partially overlaps a third IR signal transmitted through the HDMI connection device, and, based on determining that the second IR signal does not overlap the third IR signal, set the HDMI connection device as the IR signal output device for the external source device. The HDMI connection device is connected to an external source device.

The at least one program, when executed by the one or more processors individually or collectively, may further cause the display device to, based on not receiving the first IR signal from the HDMI connection device within the predetermined wait time, prevent setting the IR signal transceiver as the IR signal output device for the external source device and set the HDMI connection device as the IR signal output device for the external source device.

The at least one program, when executed by the one or more processors individually or collectively, may further cause the display device to, detect a connection to the external source device based on receiving a connection request to the external source device from the HDMI connection device. The connection request may have been sent by the HDMI connection device based on the external source device being connected to the HDMI connection device through an HDMI cable.

The at least one program, when executed by the one or more processors individually or collectively, may further cause the display device to monitor performance of the wireless communication network, determine a wireless communication delay value based on the performance of the wireless communication network, and reset an IR blaster (IRB) output device for the external source device based on a determination that the wireless communication delay value exceeds a determined threshold.

The at least one program, when executed by the one or more processors individually or collectively, may further cause the display device to, based on determining to reset the IRB output device for the external source device, re-determine whether the second IR signal at least partially overlaps the third IR signal according to the wireless communication delay value, and exclude the HDMI connection device from the IR signal output device for the external source device based on determining that the second IR signal at least partially overlaps the third IR signal.

The at least one program, when executed by the one or more processors individually or collectively, may further cause the display device to set the IR signal transceiver as the IR signal output device for the external source device based on determining that the second IR signal at least partially overlaps the third IR signal.

According to an aspect of the present disclosure, a display device includes a display, a wireless communication circuit, an IR signal transceiver, one or more processors including processing circuitry, and memory storing at least one program. The at least one program, when executed by the one or more processors individually or collectively, causes the display device to receive, from a HDMI connection device via the wireless communication circuit, content of a first source device connected to the HDMI connection device, receive, via at least one of the wireless communication circuit or the IR signal transceiver, a control command from a first controller while outputting the content using the display, identify an IR signal output device for the first source device, and, based on identifying the IR signal transceiver as the IR signal output device for the first source device, change the control command to an IR signal for the first source device and transmit, via the IR signal transceiver. The IR signal includes the control command.

The at least one program, when executed by the one or more processors individually or collectively, may further cause the display device to change the control command to the IR signal for the first source device by accessing a control command table for the first source device. The control command table may include IR signal pattern information corresponding to one or more control commands for the first source device.

The at least one program, when executed by the one or more processors individually or collectively, may further cause the display device to, based on identifying the HDMI connection device as the IR signal output device for the first source device, generate an HDMI command corresponding to the control command, and transmit, via the wireless communication circuit, the HDMI command to the HDMI connection device.

The at least one program, when executed by the one or more processors individually or collectively, may further cause the display device to, based on receiving the control command from the first controller through the wireless communication circuit, generate the HDMI command by accessing a first table for the first controller. The first table may include wireless communication signal values corresponding to one or more control commands for the first controller.

The at least one program, when executed by the one or more processors individually or collectively, may further cause the display device to generate the HDMI command by accessing a second table for the first controller based on receiving the control command from the first controller through the IR signal transceiver. The second table may include IR signal pattern information corresponding to one or more control commands for the first controller.

According to an aspect of the present disclosure, a method of a display device includes detecting, using a wireless communication circuit of the display device, a wireless connection to a HDMI connection device, determining whether a first IR signal is received, from the external source device through an IR signal transceiver of the display device, within a predetermined wait time, based on determining that the first IR signal has been received within the predetermined wait time, determining a first distance to the HDMI connection device based on a time difference between a first time point corresponding to the wireless connection to the HDMI connection device and a second time point corresponding to reception of the first IR signal, based on the first distance being within a determined IR signal arrival range, setting the IR signal transceiver as an IR signal output device for the external source device, based on the first distance and a network performance of the wireless communication circuit, determining whether a second IR signal output by the IR signal transceiver at least partially overlaps a third IR signal transmitted through the HDMI connection device, and, based on determining that the second IR signal does not overlap the third IR signal, setting the HDMI connection device as the IR signal output device for the external source device. The HDMI connection device is connected to an external source device.

The method of the display device may further include, based on not receiving the first IR signal from the HDMI connection device within the predetermined wait time, preventing setting the IR signal transceiver as the IR signal output device for the external source device and setting the HDMI connection device as the IR signal output device for the external source device.

The method of the display device may further include, monitoring performance of a wireless communication network, determining a wireless communication delay value based on the performance of the wireless communication network, and resetting an IRB output device for a first source device based on determining that the wireless communication delay value exceeds a determined threshold.

The resetting of the IRB output device for the first source device may include re-determining whether the second IR signal at least partially overlaps the third IR signal according the wireless communication delay value, and excluding the HDMI connection device from the IR signal output device for the external source device based on determining that the second IR signal at least partially overlaps the third IR signal.

The method of the display device may further include setting the IR signal transceiver as the IR signal output device for the external source device based on determining that the second IR signal at least partially overlaps the third IR signal.

The method of the display device may further include receiving content of the external source device from the HDMI connection device through the wireless communication circuit, receiving a control command from a first controller through at least one of the wireless communication circuit or the IR signal transceiver while outputting the content of the external source device using a display of the display device, identifying the IR signal output device for the external source device, and, based on identifying the IR signal transceiver as the IR signal output device for the external source device, changing the control command to an IR signal for the external source device, and transmitting, to the external source device through the IR signal transceiver, the IR signal including the control command. The changing of the control command to the IR signal for the external source device may further include changing the control command to the IR signal for the external source device by accessing a control command table for the external source device. The control command table may include IR signal pattern information corresponding to one or more control commands for the external source device.

The method of the display device may further include, based on identifying the HDMI connection device as the IR signal output device for the external source device, generating an HDMI command corresponding to the control command and transmitting the HDMI command to the HDMI connection device through the wireless communication circuit.

The generating of the HDMI command corresponding to the control command may include generating the HDMI command by accessing a table for the first controller based on receiving the control command from the first controller through the wireless communication circuit. The table may include wireless communication signal values corresponding to one or more control commands for the first controller.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure may be more apparent from the following description taken in conjunction with the accompanying drawings, in which.

DETAILED DESCRIPTION

Figure 1:
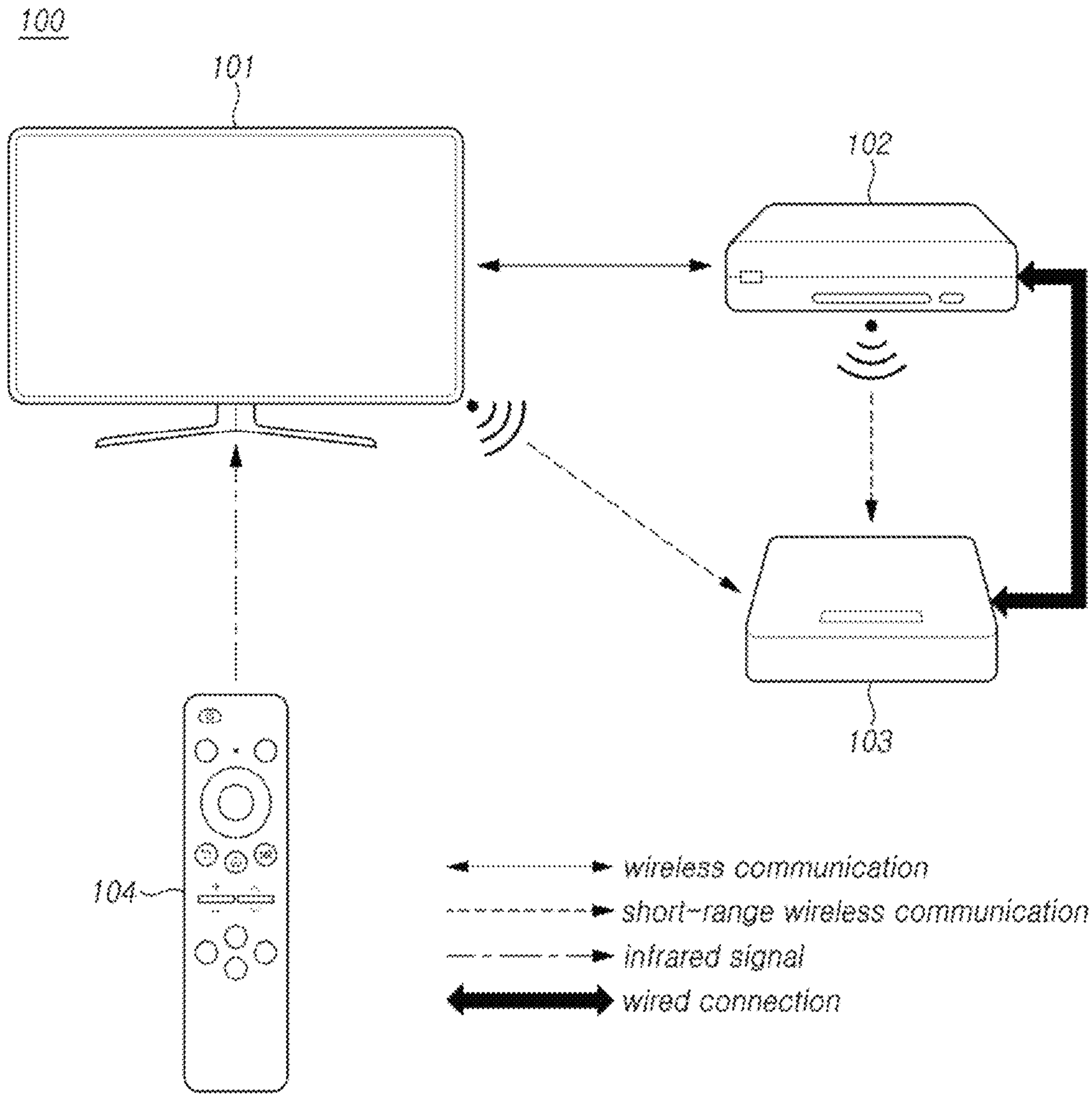
FIG. 1 illustrates a display device and a peripheral device, according to an embodiment of the disclosure.

Hereinafter, embodiments of the disclosure are described with reference to the drawings so that those skilled in the art to which the disclosure pertains may easily practice the disclosure. However, the disclosure may be implemented in other various forms and is not to be limited to the embodiments set forth herein. The same or similar reference denotations may be used to refer to the same or similar elements throughout the specification and the drawings. Further, for clarity and brevity, no description may be made of well-known functions and configurations in the drawings and relevant descriptions.

As used herein, when an element or layer is referred to as "covering", "overlapping", or "surrounding" another element or layer, the element or layer may cover at least a portion of the other element or layer, where the portion may include a fraction of the other element or may include an entirety of the other element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

FIG. 1 illustrates a home network environment, according to an embodiment of the disclosure.

Referring to FIG. 1, the home network environment 100 may include a display device 101 and a plurality of peripheral devices (e.g., a first peripheral device 102, a second peripheral device 103, and a third peripheral device 104). The display device 101 may be and/or may include an electronic device that may provide image content. For example, the display device 101 may be and/or may include, for example, a television (TV), a monitor, a tablet computer, a smart display, or the like. The plurality of peripheral devices may be and/or may include devices that may interact with the display device 101. For example, each of the plurality of peripheral devices may transmit data and/or transmit and/or receive commands to and/or from the display device 101. The display device 101 may be connected to the plurality of peripheral devices in a wired and/or wireless manner. The plurality of peripheral devices may be and/or may include, but not be limited to, a TV controller (e.g., the third peripheral device 104), a high-definition multimedia interface (HDMI) connection device (e.g., the first peripheral device 102), a source device (e.g., the second peripheral device 103), a sound bar, or the like. However, embodiments of the present disclosure are not limited thereto, and the plurality of peripheral devices may include a different number of devices (e.g., more than three (3) devices) and/or different types of devices. The source device 103 may be and/or may include a device that may provide image content to the display device 101, such as, but not limited to, a set-top box (STB), a digital versatile disc (DVD) player, a Blu-ray disc player, a game console, a personal computer (PC), a notebook, a streaming device, a media player, or the like.

According to an embodiment, the display device 101 may control a plurality of source devices using one controller.

Referring to FIG. 1, the display device 101 may receive a command for controlling the source device 103 connected to the display device 101 from the TV controller 104. In an embodiment, the display device 101 may change the control command received from the TV controller 104 into a control signal of the corresponding source device 103 and transmit the same.

The TV controller 104 may receive a user input for controlling functions (e.g., volume adjustment, change channel, or the like) of the display device 101 and transfer a user input to the display device 101. The display device 101 may be connected to the TV controller 104 using short-range wireless communication. For example, the display device 101 may receive a control command from the TV controller 104 as an infrared radiation (IR) signal and/or a Bluetooth™ signal.

The display device 101 may be connected to a plurality of source devices 103. The display device 101 may be indirectly connected to the source device 103 through the HDMI connection device 102, and/or directly connected wirelessly to each of the plurality of source devices 103. The HDMI connection device 102 may mediate the connection between the display device 101 and the source device 103. The HDMI connection device 102 may connect one display device 101 to the plurality of source devices 103. The HDMI connection device 102 may perform wired and/or wireless communication. The HDMI connection device 102 may be connected to the display device 101 using wireless communication. For example, the HDMI connection device 102 may transmit data to the display device 101 based on wireless-fidelity (Wi-Fi) wireless communication and/or receive a control signal. The HDMI connection device 102 may be connected to the source device 103 based on wired and/or wireless communication. For example, the HDMI connection device 102 may receive a high-definition data source from the source device 103 using a wired HDMI cable. Since the HDMI connection device 102 and the source device 103 are connected using a wired cable, the physical distance between the two devices may be relatively short. When the physical distance between the HDMI connection device 102 and the source device 103 is short (e.g., less than a predetermined threshold), the display device 101 may predict (or estimate) the distance to the source device 103 based on the distance to the HDMI connection device 102. The HDMI connection device 102 may transmit an IR signal to the source device 103 using an IR blaster IR blaster (IRB). The display device 101 may receive high-definition video/audio data, which may be and/or may include high-capacity data of the source device 103, through the HDMI connection device 102, and may directly transfer a simple control signal to the source device 103 using the IR blaster.

As shown in FIG. 1, the display device 101 may receive a control command from the TV controller 104 through a Bluetooth™ and/or IR signal. The display device 101 may be connected to the HDMI connection device 102 using Wi-Fi communication. The display device 101 may transmit the IR signal to the source device 103. The HDMI connection device 102 may receive high-capacity data from the source device 103 through a wired cable and transmit an IR signal to the source device 103.

Figure 2:
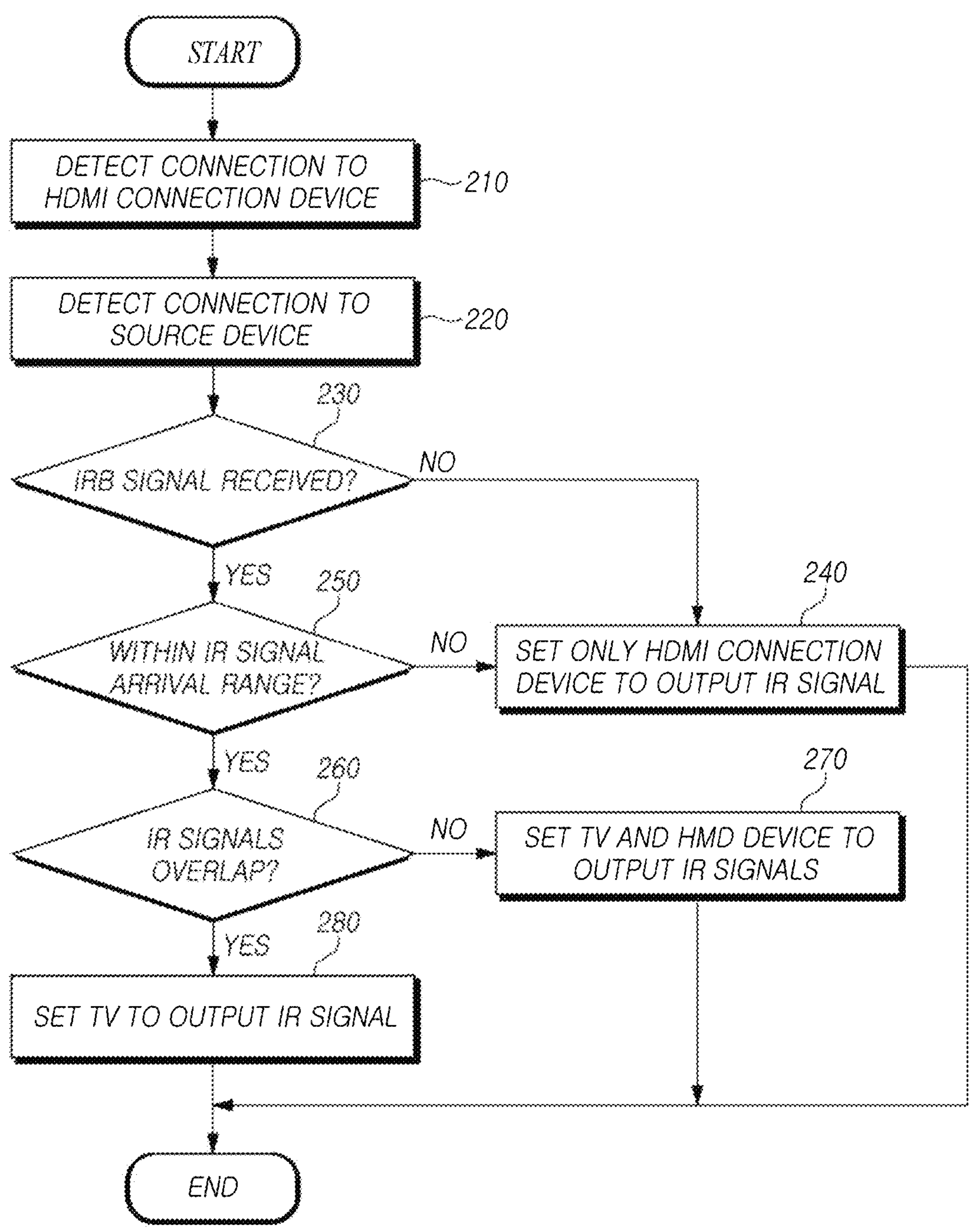
FIG. 2 is a flowchart illustrating an operation in which a display device determines an output device of a control signal (e.g., an infrared (IR) signal) of a source device, according to an embodiment of the disclosure.

FIG. 2 is a flowchart illustrating an operation in which a display device determines an output device of a control signal (IR signal) of a source device, according to an embodiment of the disclosure.

Referring to FIG. 2, the display device (e.g., the display device 101 of FIG. 1 or a TV) may perform method to determine which device (e.g., the display device 101 or the HDMI connection device HDMI connection device 102 of FIG. 1) receives a command received from the TV controller (e.g., the TV controller 104 of FIG. 1) as an IR signal. Each operation of the method may be sequentially performed, but may not necessarily be performed sequentially. For example, the order of the operations may be changed, and at least two (2) operations may be performed in parallel.

In operation 210, the display device 101, according to an embodiment, may detect a connection to the HDMI connection device 102. The display device 101 may receive a connection request from the HDMI connection device 102 based on wireless communication (e.g., Wi-Fi) and may perform a connection operation.

In operation 220, the display device 101, according to an embodiment, may detect a connection to the source device 103. When the source device 103 is initially connected to the HDMI connection device 102 wiredly, the HDMI connection device 102 may be configured to transmit a predetermined test signal (e.g., an IR signal) to the display device 101. The HDMI connection device 102 may mediate a connection between the display device 101 and the source device 103, and the display device 101 may perform an initial setting operation through the connection to the source device 103. For example, the display device 101 may register the source device 103 and store connection information. The display device 101 may receive a control command table from the source device 103 through the HDMI connection device 102. The control command table may include infrared signal pattern information set for each command for controlling the source device 103. For example, the IR signal pattern for each command for the source device 103 (e.g., an STB) may set an IR signal pattern for each command (e.g., '10101' for a channel change command). The control command table may be defined differently for each manufacturer and/or product model of the source device 103.

In operation 230, the display device 101, according to an embodiment, may receive the IRB signal transmitted by the HDMI connection device 102. In an embodiment, the source device 103 may not include an IRB transmitter. The display device 101 may detect an IRB signal transmitted by the HDMI connection device 102, which may be in a physically close (e.g., nearby, within a predetermined threshold) location due to a wired cable connection, and may predict (estimate) the distance to the source device 103. For example, the display device 101 may consider the distance to the HDMI connection device 102 as the distance to the source device 103.

The IR signal, by the nature of the signal's characteristics, may have a limited arrival range and/or may be unable to penetrate obstacles due to its rectilinear propagation. For example, the display device 101 may not receive the IRB signal if the distance from the HDMI connection device 102 is relatively long, and/or if there is an obstacle in the line of sight. The display device 101 may identify whether an IRB signal is received from the HDMI connection device 102 in the expected arrival time from the time point when the source device 103 is connected through the HDMI connection device 102.

In operation 240, the display device 101, according to an embodiment, may set only the HDMI connection device 102 to output an IR signal for the source device 103 when the IRB signal transmitted by the HDMI connection device 102 is not received in the expected arrival time (NO in operation 230). When the display device 101 does not receive the IRB signal, the display device 101 may determine that infrared signal transmission/reception between the display device 101 and the HDMI connection device 102 may not be smooth (e.g., reliable), and may not function as an output device that directly transmits an IR signal to the source device 103.

In operation 250, when receiving an IRB signal from the HDMI connection device 102 (YES in operation 230), the display device 101, according to an embodiment, may determine whether the IR signal is included in the arrival range. The display device 101 may calculate the distance from the HDMI connection device 102 from the time from the time point when the source device 103 is connected to the time point when the IRB signal is received. The display device 101, even when receiving an IRB signal from the source device 103, may be set such that only the HDMI connection device 102 outputs an IR signal to the source device 103 if the distance is too long to directly transmit a control command (NO in operation 250). The arrival range for the IR signal may be determined in a range in which a control command processing delay does not occur. Since the position and IRB performance may be different for each source device 103, the arrival range for the IR signal may be set differently for each source device 103.

In operation 260, the display device 101, according to an embodiment, may determine whether the IR signal overlaps in the source device 103, when the IRB signal from HDMI connection device 102 is received within the arrival range (YES in operation 250). When the display device 101 directly transmits the IR signal to the source device 103 using the IRB, the distance between the electronic device 101 and the HDMI connection device 102 may be regarded as the distance between the electronic device 101 and the source device 103, and the first time point when the IR signal is received from the source device 103 may be calculated based on the distance to the HDMI connection device 102 and the IR signal strength. Further, when the command is transferred through the HDMI connection device 102, the display device 101 may calculate the second time point when the IR signal is received from the source device 103 based on the time required for wireless communication with the HDMI connection device 102 and the IR signal strength of the HDMI connection device 102. The display device 101 may determine a signal overlap based on the difference between T1 and T2.

In operation 270, the display device 101, according to an embodiment, may be configured to output an IR signal from both the display device 101 and the HDMI connection device 102 in response to determining that IR signal overlap does not occur in the source device 103 (NO in operation 260).

In operation 280, the display device 101, according to an embodiment, may set only the display device 101 as an output device that outputs an IR signal in response to determining that IR signal overlap occurs in the source device 103 (YES in operation 260).

The display device 101, according to an embodiment, may determine the IRB output device through operations 210 to 280 when initially connected to the HDMI connection device 102 and a specific source device 103. The display device 101 may store and manage information about the IRB output device determined for the specific source device 103. When reconnecting the previously connected source device 103, the display device 101 may identify the IRB output device by referring to the stored IRB output device information.

Figure 3:
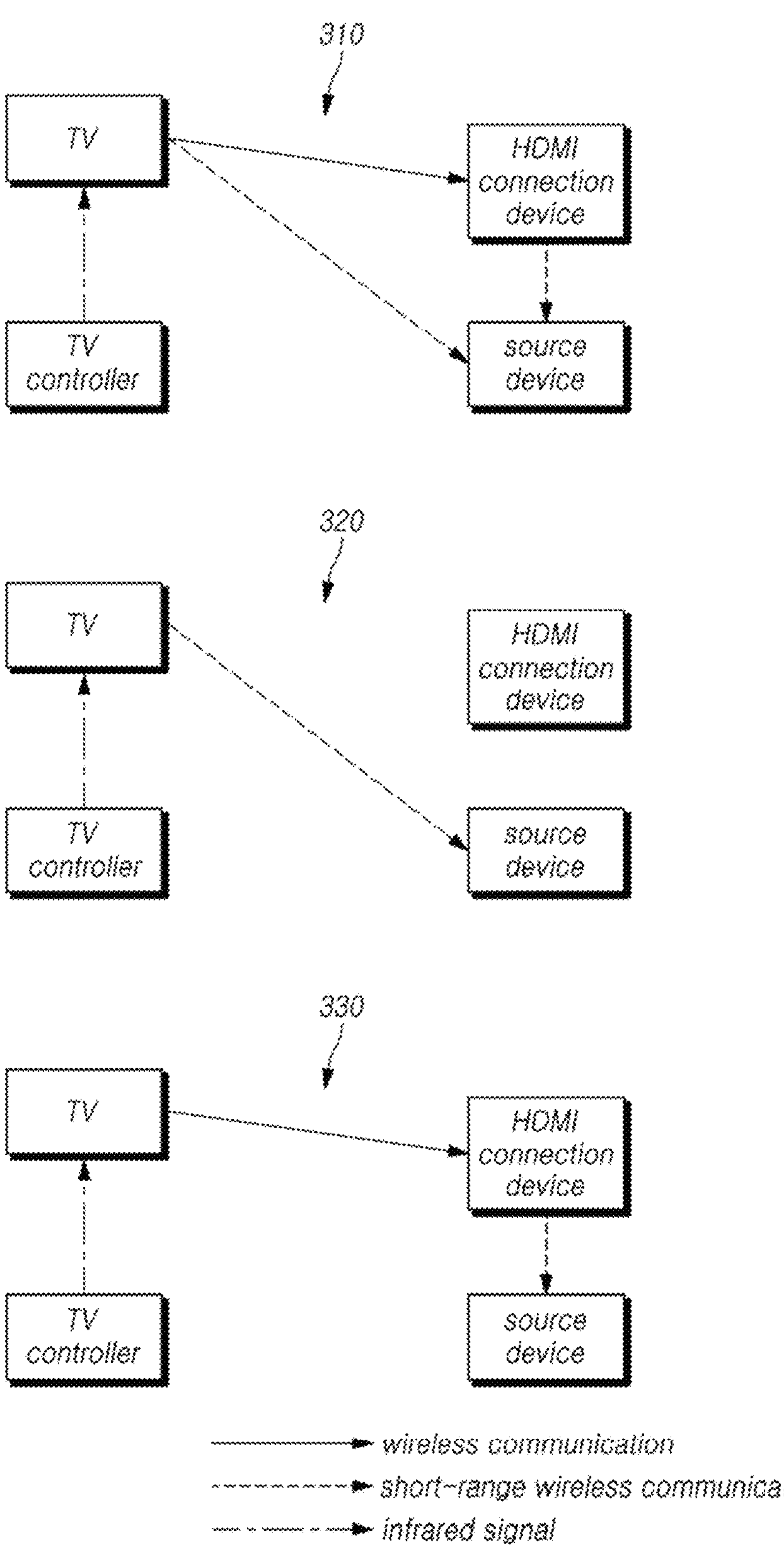
FIG. 3 illustrates examples in which at least one of a display device or an high-definition multimedia interface (HDMI) connection device outputs an IR signal, according to an embodiment of the disclosure.

FIG. 3 illustrates examples in which at least one of a display device or an HDMI connection device outputs an IR signal, according to an embodiment of the disclosure.

The display device (e.g., the display device 101 of FIG. 1), according to an embodiment, may receive and/or process control commands of a source device (e.g., the source device 103 of FIG. 1) using a TV controller (e.g., the TV controller 104 of FIG. 1), according to various methods.

In a first method 310, as shown in FIG. 3, the display device TV 101 may transmit an IR signal directly and through an HDMI connection device (e.g., the HDMI connection device 102 of FIG. 1). In response to receiving a control command from the TV controller 104, the display device 101 may generate an IR signal by referring to (e.g., accessing) the control command table of the corresponding source device. The display device 101 may transmit an IR signal using an IRB. The display device 101 may transmit a HDMI command for the control command to the HDMI connection device 102. The HDMI command may not be an IR signal pattern, and may include information about a control command received from the TV controller, information about the source device currently being connected, and/or an instruction to change to an IR signal, and transmit the IR signal including the control command. The display device 101 may process the operation of transmitting the IR signal and the operation of transmitting the HDMI command in parallel so that the signals are simultaneously transmitted (e.g., at a substantially similar and/or the same time). The display device 101 may transmit an HDMI command to the HDMI connection device 102 based on Wi-Fi communication, and may transmit an IR signal to the source device 103 using the IBR.

For example, when wireless network connection between the display device 101 and the HDMI connection device 102 is smooth (e.g., reliable, satisfactory), and infrared signal transmission and/or reception between the display device 101 and the source device 103 is smooth, it may be preferable for both the display device 101 and the HDMI connection device 102 to transmit IR signals according to the first method 310. Due to the rectilinear propagation of IR signals, whether the source device 103 receives the signal may vary depending on the IRB position of the display device 101, intensity, signal arrival distance, and/or presence of variable obstacles. Similarly, the reception at the source device 103 may vary depending on the IRB position of the HDMI connection device 102, intensity, signal arrival distance, and the presence of variable obstacles. Accordingly, when the display device 101 and the HDMI connection device 102 both transmit IR signals, the source device 103 may expand the reception range of the IR signals to increase the probability that the IR signals reliably reach the source device 103.

In an embodiment, the display device 101 may adjust the IR signal transmission time point T1 for the source device 103 and the time point T2 for transmitting an HDMI command for the HDMI connection device 102. For example, when the display device 101 passes through the HDMI connection device 102, a time difference may occur, so the HDMI command for the HDMI connection device 102 may be first transmitted, and an IR signal may be generated to transmit the IR signal to the source device 103 through the IRB.

In a second method 320, as shown in FIG. 3, the display device 101 may directly transmit an IR signal to the source device 103. In response to receiving a control command from the TV controller 104, the display device 101 may generate an IR signal by referring to the control command table of the corresponding source device and transmit the IR signal using the IRB. In such a case, the display device 101 may not need to generate an HDMI command and may not take any action on the HDMI connection device 102.

As an example, when both the display device 101 and the HDMI connection device 102 transmit IR signals, and there is a possibility of IR signal overlap occurring at the source device 103, it may be preferable to transmit the IR signal solely from the display device 101, according to the second method, provided that the transmission and reception of infrared signals between the display device 101 and the source device 103 are smooth.

In a third method 330, as shown in FIG. 3, the display device 101 may transfer the IR signal only through the HDMI connection device 102. In response to receiving the control command from the TV controller 104, the display device 101 may generate an HDMI command for the control command and transmit the HDMI command to the HDMI connection device 102. In response to receiving the HDMI command through the display device 101, the HDMI connection device 102 may generate an IR signal corresponding to the HDMI command by referring to the control command table of the corresponding source device, and may transmit the IR signal to the source device 103 using the IRB of the HDMI connection device 102.

For example, when infrared signal transmission/reception between the display device 101 and the source device 103 are not smooth, it may be preferable to transmit the IR signal only from the HDMI connection device 102, according to the third method 330. Since the display device 101 and the HDMI connection device 102 may be connected based on wireless communication, HDMI commands may be transmitted safely even if some delay occurs, and since the HDMI connection device 102 and the source device 103 may also be connected via a wired cable, it may be expected that transmission/reception of IR signals that are affected by distance may be smooth.

The display device 101, according to an embodiment, may identify the IRB output device for each source device, and transfer a control command received from the TV controller 104 to the source device according to any one of the first method 310, the second method 320, or the third method 330.

Figure 4:
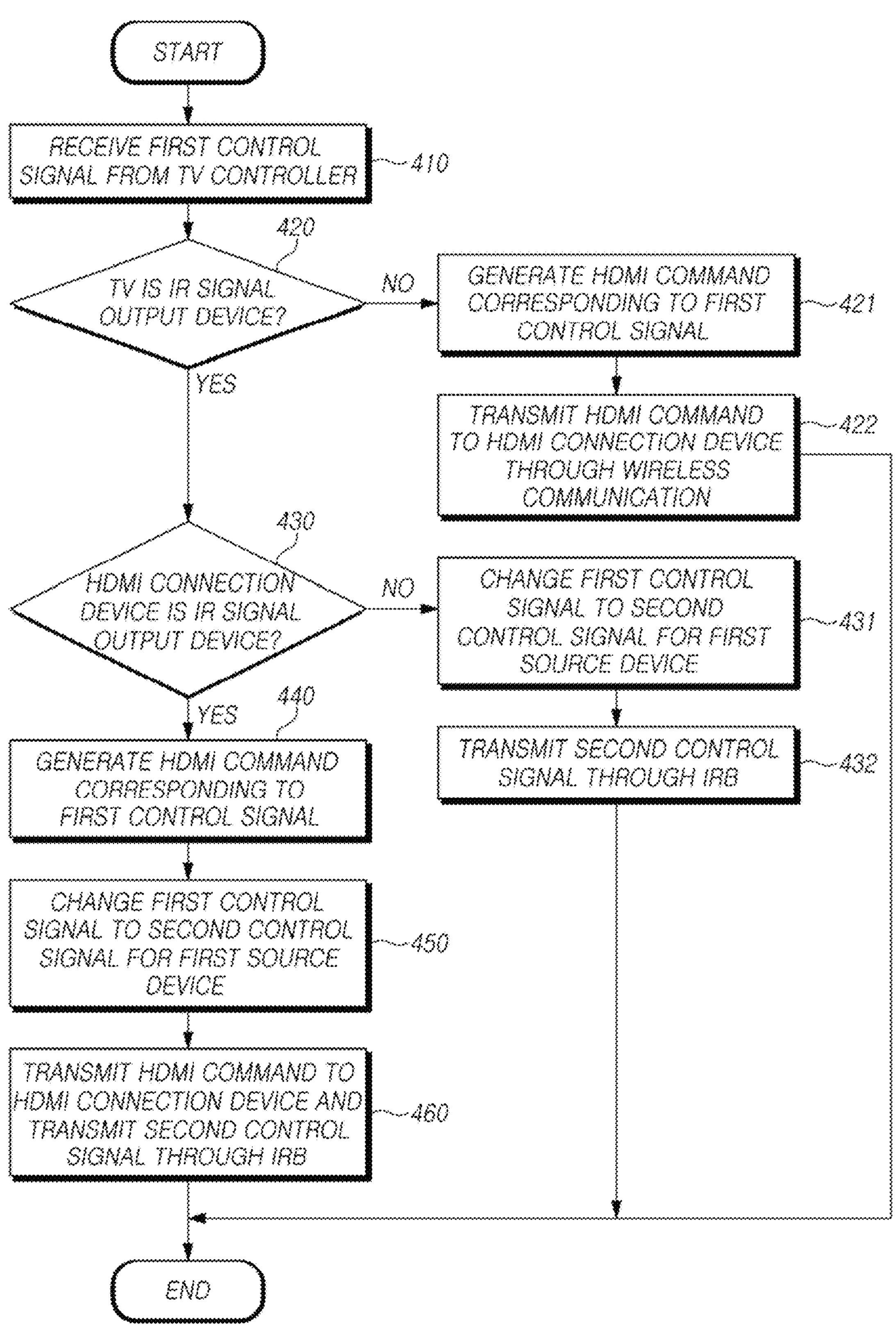
FIG. 4 is a flowchart illustrating an operation of controlling a source device using a TV controller by a display device, according to an embodiment of the disclosure.

FIG. 4 is a flowchart illustrating an operation of controlling a source device using a TV controller by a display device, according to an embodiment of the disclosure.

Referring to FIG. 4, the display device (e.g., the display device 101 of FIG. 1 or a TV) (hereinafter, referred to as a TV) may perform method to convert a command received from the TV controller (e.g., the TV controller 104 of FIG. 1) into a control signal of a source device (e.g., the source device 103 of FIG. 1) and transmit the same through the output device (IRB). Each operation of the method may be sequentially performed, but may not necessarily be performed sequentially. For example, the order of the operations may be changed, and at least two (2) operations may be performed in parallel.

In operation 410, the display device 101, according to an embodiment, may receive a first control signal from the TV controller 104. The first control signal may be a command for the display device 101 and/or the source device 103. When the display device 101 is reproducing image and/or media data through the first source device 103, the display device 101 may determine the first control signal as a command for the first source device 103.

In operation 420, the display device 101, according to an embodiment, may identify whether the TV is an IR signal output device. The display device 101 may identify at least one of a TV or an HDMI connection device (e.g., the HDMI connection device 102 of FIG. 1) as an output device by referring to the IRB output device information set in the previous connection to the first source device 103. The method of FIG. 4 may proceed to operation 430 in response to identifying that the TV is an IRB output device (YES in operation 420).

In operation 421, the display device 101, according to an embodiment, may generate an HDMI command corresponding to the first control signal so that the HDMI connection device 102 may output an IRB signal in response to identifying that the TV is not an IRB output device (NO in operation 420). The HDMI command may include information about the first control signal and an instruction to change into an IR signal for the first source device 103 and transmit the same.

In operation 422, the display device 101, according to an embodiment, may transmit an HDMI command to the HDMI connection device 102 through wireless communication (e.g., Wi-Fi). The display device 101 may complete the processing of the first control signal by transmitting the HDMI command to the HDMI connection device 102.

In operation 430, the display device 101, according to an embodiment, may determine whether the HDMI connection device 102 is an IRB output device for the first source device 103. The method of FIG. 4 may proceed to operation 440 in response to identifying that the HDMI connection device 102 is an IRB output device for the first source device 103 (YES in operation 420).

In operation 431, the display device 101, according to an embodiment, may determine that only the TV is an IRB output device in response to identifying that the HDMI connection device 102 is not an IRB output device for the first source device 103 (NO in operation 430). The display device 101 may change the first control signal into the second control signal for the first source device. The second control signal may be an IR signal pattern.

The command received from the TV controller may be defined as illustrated in Table 1.

TABLE 1

| command | IR signal pattern (Hex code) | device code | Description |
|---|---|---|---|
| power on | 0xA90 | 0x00A1 | TV power-on command |
| power off | 0xA91 | 0x00A1 | TV power-off command |
| channel up | 0xA92 | 0x00A1 | change to next channel |
| channel down | 0xA93 | 0x00A1 | change to previous channel |
| volume up | 0xA94 | 0x00A1 | volume-up command |
| volume down | 0xA95 | 0x00A1 | volume-down command |
| mute | 0xA96 | 0x00A1 | toggle mute |
| open menu | 0xA97 | 0x00A1 | open TV menu |
| change input source | 0xA98 | 0x00A1 | input source change command |
| play | 0xA99 | 0x00A1 | media playback command |
| stop | 0xA9A | 0x00A1 | media stop command |

The IR signal pattern may represent the IR signal transmitted by the TV controller 104, and the device code may represent device identification information about the TV controller 104. For example, the display device 101 may receive the 0xA99 signal (e.g., a first control signal) for the playback command and generate an IR signal for the first source device 103 corresponding thereto. Each source device 103 may define a control command table, and the display device 101 may receive control command table information when initially connected to the source device 103. A control command table including IR signal pattern information for each command for the first source device 103 may be defined as illustrated in Table 2.

TABLE 2

| command | IR signal pattern (Hex code) | device code | Description |
|---|---|---|---|
| power on | 0x20DF10EF | 0x00C1 | set-top box power-on command |
| power off | 0x20DF10EE | 0x00C1 | set-top box power-off command |
| channel up | 0x20DF10F0 | 0x00C1 | change to next channel |
| channel down | 0x20DF10F1 | 0x00C1 | change to previous channel |
| volume up | 0x20DF10F2 | 0x00C1 | volume-up command |
| volume down | 0x20DF10F3 | 0x00C1 | volume-down command |
| play | 0x20DF10F4 | 0x00C1 | media playback command |
| stop | 0x20DF10F5 | 0x00C1 | media stop command |
| open menu | 0x20DF10F6 | 0x00C1 | open set-top box menu |

The IR signal pattern may represent the IR signal received by the first source device 103, and the device code may represent device identification information about the first source device 103. Referring to Tables 1 and 2, for example, the display device 101 may receive a 0xA99 signal (e.g., a first control signal) for a playback command and generate an IR signal pattern for the first source device 103 corresponding thereto as 0x20DF10F4 (second control signal).

In operation 432, the display device 101, according to an embodiment, may transmit the second control signal through the IRB included in the display device 101. The display device 101 may complete the processing of the first control signal by transmitting the second control signal.

In operation 440, the display device 101, according to an embodiment, may determine that both the TV and the HDMI connection device 102 are IRB output devices in response to identifying that the HDMI connection device 102 is an IRB output device for the first source device 103. The display device 101 may execute operations for transmitting an IR signal and an HDMI command to the two devices in parallel.

Although operations 440, 450, and 460 are delineated in sequence for the convenience of explanation, embodiments of the present disclosure are not limited thereto. That is, an execution order of the operations may differ based on design constraints. For example, the operations may be performed simultaneously (e.g., at a substantially same time) in parallel.

The display device 101 may generate an HDMI command corresponding to the first control signal. The operation may be substantially similar and/or the same as operation 421.

In operation 450, the display device 101, according to an embodiment, may change the first control signal into a second control signal for the first source device 103. The operation may be substantially similar and/or the same as operation 431.

In operation 460, the display device 101, according to an embodiment, may transmit an HDMI command to the HDMI connection device 102 and simultaneously transmit the second control signal through the IRB of the display device 101.

Figure 5:
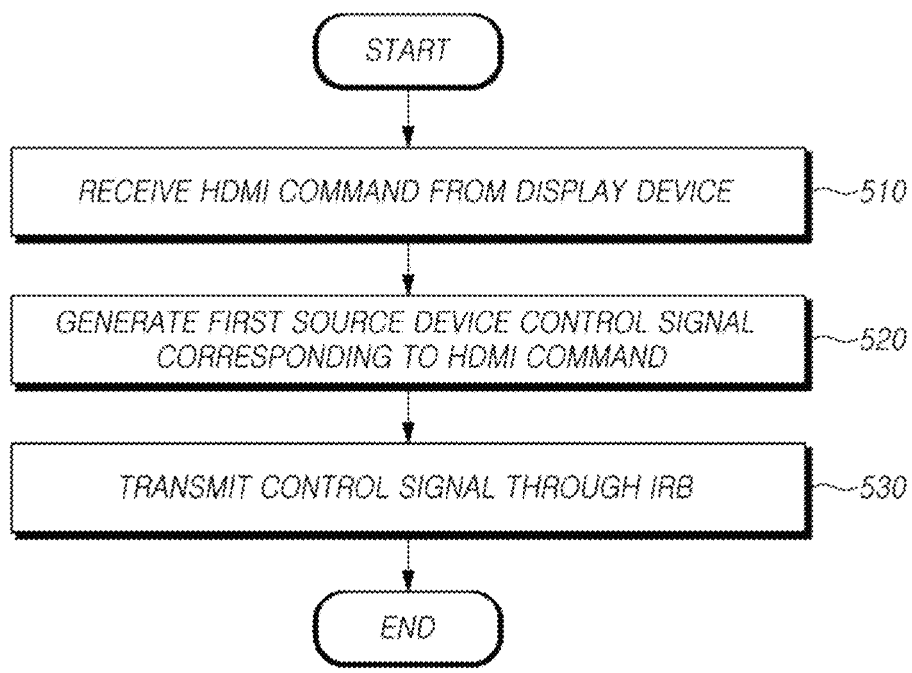
FIG. 5 is a flowchart illustrating an operation in which an HDMI connection device controls a source device, according to an embodiment of the disclosure.

FIG. 5 is a flowchart illustrating an operation in which an HDMI connection device controls a source device, according to an embodiment of the disclosure.

Referring to FIG. 5, the HDMI connection device (e.g., the HDMI connection device 102 of FIG. 1) may perform method to receive a control command from the TV controller (e.g., the TV controller 104 of FIG. 1) from the display device (e.g., the display device 101 of FIG. 1 or a TV), convert the control command into a control signal of the source device (e.g., the source device 103 of FIG. 1), and transmit the same through the output device (IRB). Each operation of the method may be sequentially performed, but may not necessarily be performed sequentially. For example, the order of the operations may be changed, and at least two (2) operations may be performed in parallel.

In operation 510, according to an embodiment, the HDMI connection device 102 may receive an HDMI command from the display device 101. The HDMI command may include information about the control command received from the TV controller, information about the source device currently being connected, and an instruction to change to an IR signal and transmit the IR signal. The HDMI connection device 102 may be connected to a plurality of source devices. The HDMI connection device 102 may identify a control command and the source device currently being connected from the HDMI command. The HDMI connection device 102 may identify the currently connected source device as the first source device.

In operation 520, according to an embodiment, the HDMI connection device 102 may generate a control signal for the first source device corresponding to the HDMI command. The HDMI connection device 102 may generate the IR signal pattern as a control signal by referring to the control command table (e.g., FIG. 2) defined in the first source device.

In operation 530, according to an embodiment, the HDMI connection device 102 may transmit a control signal through the IRB of the HDMI connection device 102.

Figure 6:
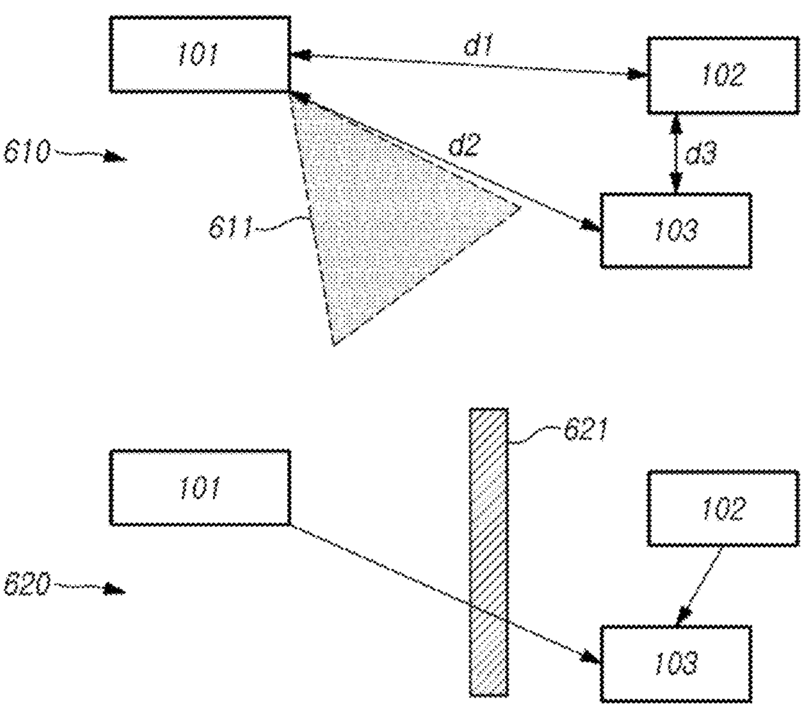
FIG. 6 illustrates examples of various communication environments between a display device and a peripheral device, according to an embodiment of the disclosure.
Figure 6:
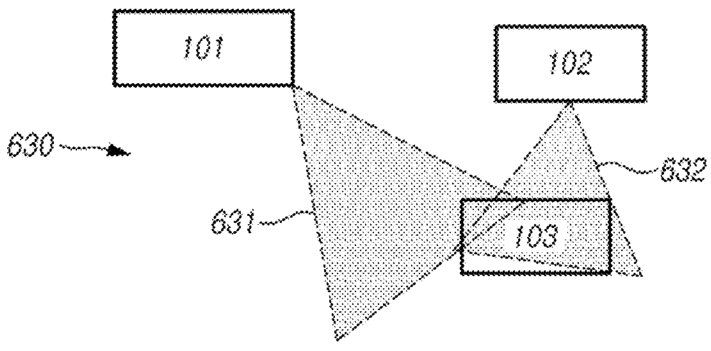

FIG. 6 illustrates examples of various communication environments between a display device and a peripheral device, according to an embodiment of the disclosure.

According to an embodiment, the home network environment (e.g., the home network environment 100 of FIG. 1) may include a display device (e.g., the display device 101 of FIG. 1) and peripheral devices (e.g., a first peripheral device 102 and a second peripheral device 103). The peripheral devices may be an HMDI connection device (e.g., the HMDI connection device 102 of FIG. 1) and a source device (e.g., the source device 103 of FIG. 1). The communication environment in the home network environment may vary according to the type and performance of wireless communication.

In the first home network environment 610, as shown in FIG. 6, the distances between the display device 101, the HDMI connection device 102, and the source device 103 may be a first distance d1 between the display device 101 and the HDMI connection device 102, a second distance d2 between the display device 101 and the source device 103, and a third distance d3 between the HDMI connection device 102 and the source device 103. In the case of infrared signal transmission/reception, the arrival range of the IR signal may be determined according to the strength of the IRB of the transmission device and the distance between the transmission device and the reception device. In the first home network environment 610, the signal arrival range 611 of the IRB of the display device 101 may not reach the source device 103. The display device 101 may predict whether wireless communication by the infrared signal is possible by determining whether the second distance d2 is included in the signal arrival range of the IRB. However, since the source device 103 may not include an IRB transmitter, the display device 101 may calculate the distance d1 to the HDMI connection device 102 using an IR test signal transmitted by the HDMI connection device 102 positioned at the physically close distance d3 to the source device 103, and regard the distance d1 to the HDMI connection device 102 as the distance d2 to the source device 103.

The second home network environment 620, as shown in FIG. 6, may include an obstacle 621. The obstacle 621 may include, but not be limited to, a wall, a piece of furniture, or a person. Depending on the type of the obstacle 621, wireless communication may not be possible. For example, an infrared signal may not pass through the physical obstacle 621. As another example, Wi-Fi signal may communicate regardless of the physical obstacle 621. The IRB of the display device 101 may not transfer the IR signal to the source device 103 due to the obstacle 621 even when the IR signal is transferred. Alternatively, there may be no physical obstacle between the HDMI connection device 102 and the source device 103. Therefore, the IRB of the HDMI connection device 102 may be transferred to the source device 103 when transferring the IR signal.

The third home network environment 630, shown in FIG. 6, may indicate a range in which the IR signal may be received by the source device 103 according to the IR signal arrival range by the display device 101 and the HDMI connection device 102. When the display device 101 transmits an IR signal through the IRB, the first arrival range 631 of the IR signal may include the source device 103. When the HDMI connection device 102 transmits an IR signal through the IRB, the second arrival range 632 of the IR signal may also include the source device 103. When the source device 103 receives IR signals from both the display device 101 and the HDMI connection device 102, the IR signal reception range may be broadened, thereby allowing for relatively stable reception of IR signals. For example, the source device 103 may have a reduced probability of failing to receive an IR signal due to an obstacle (e.g., a person) moving within the entire range that includes both the first arrival range 631 and the second arrival range 632.

Figure 7:
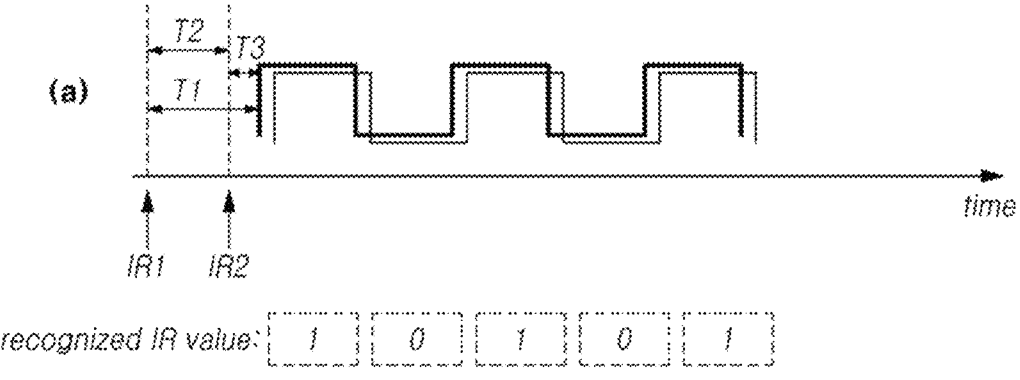
FIG. 7 illustrates an example of a control signal graph received by a source device, according to an embodiment of the disclosure.
Figure 7:
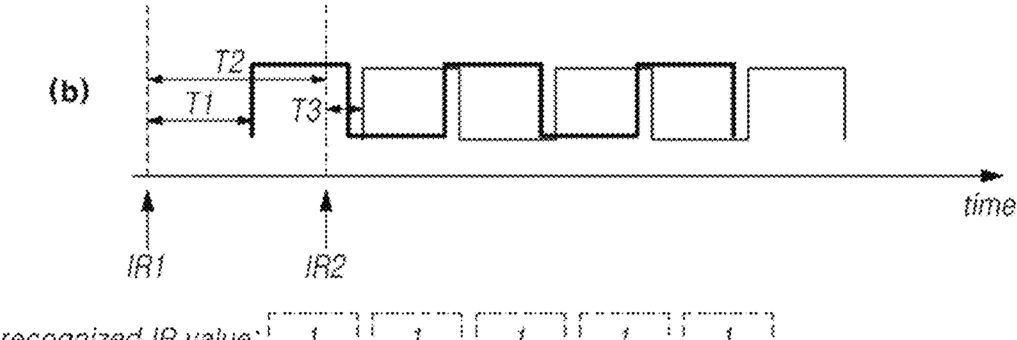

FIG. 7 illustrates an example of a control signal graph received by a source device, according to an embodiment of the disclosure.

The source device 103, according to an embodiment, may receive two IR signals received from the display device (e.g., the display device 101 of FIG. 1) and the HDMI connection device (e.g., the HDMI connection device 102 of FIG. 1).

In graphs (a) and (b) of FIG. 7, IR1 indicates the time point when the display device 101 transmits the IR signal, and IR2 indicates the time point when the HDMI connection device 102 transmits the IR signal. The first time point T1 represents the time when the IR signal output from the display device 101 first reaches the source device 103. The second time point T2 represents the time when the HDMI command output by the display device 101 reaches the HDMI connection device 102. The third time point T3 represents the time when the IR signal output from the HDMI connection device 102 first reaches the source device 103. The thick line represents the IR signal transmitted by the display device 101, and the thin line represents the IR signal transmitted by the HDMI connection device 102.

As shown in (a) of FIG. 7, the thick line IR signal representing the IR signal transmitted by the display device 101 and the thin line IR signal representing the IR signal transmitted by the HDMI connection device 102 may substantially coincide. In such a scenario, the IR value recognized by the source device 103 may be "10101". When two IR signals are received by the source device 103 in a nearly identical manner, an IR signal reception sensor of the source device 103 can recognize the two IR signals as one signal because the two IR signals have the same value. The source device 103 can correctly recognize the two IR signals transmitted from the display device 101 and the HDMI connection device 102 as one IR signal value.

As shown in (b) of FIG. 7, the thick line IR signal representing the IR signal transmitted by the display device 101 and the thin line IR signal representing the IR signal transmitted by the HDMI connection device 102 may overlap each other, resulting in an overlap between the signals. In such a scenario, the IR value recognized by the source device 103 may be "11111". When two IR signals are partially overlapped and received by the source device 103, the source device 103 may recognize a second value ("0") of the IR signal (thick line) that arrived first and a first value ("1") of the IR signal (thin line) that arrived later at the same timing (e.g., the second IR value of recognized IR value) according to the high/low timing recognition cycle of the IR signal reception sensor. The source device 103 may incorrectly recognize the two IR signals transmitted from the display device 101 and the HDMI connection device 102 as values different from the original IR signal values due to the overlap.

That is, in the scenario depicted in (a), the IR signal may be recognized correctly, while in the scenario depicted in (b), the IR signal may be misrecognized. Referring to FIG. 7, two signals may be normally recognized as signal values output by the display device 101 or the HDMI connection device 102 when second time T2+third time T3−first time T1 is within a threshold T (e.g., $T<T2+T3-T1$). The threshold T may be determined based on the switching time of the output IR signal and the high/low timing recognition period of the source device 103. For example, when the switching time of the IR signal is TS and the high/low timing recognition period of the source device 103 is around 10% of TS, the threshold may be set to TS divided by ten (10) (e.g., $T=TS/10$).

The display device 101, according to an embodiment, may calculate the first time T1 and the third time T3 based on the distance from the source device 103. The display device 101 may monitor in real-time to determine whether the second time T2 increases and/or decreases, according to wireless communication performance with the HDMI connection device 102. When the wireless communication performance with the HDMI connection device 102 changes during communication with the source device 103, the display device 101 may again determine an output device to output an IR signal through real-time monitoring.

Figure 8:
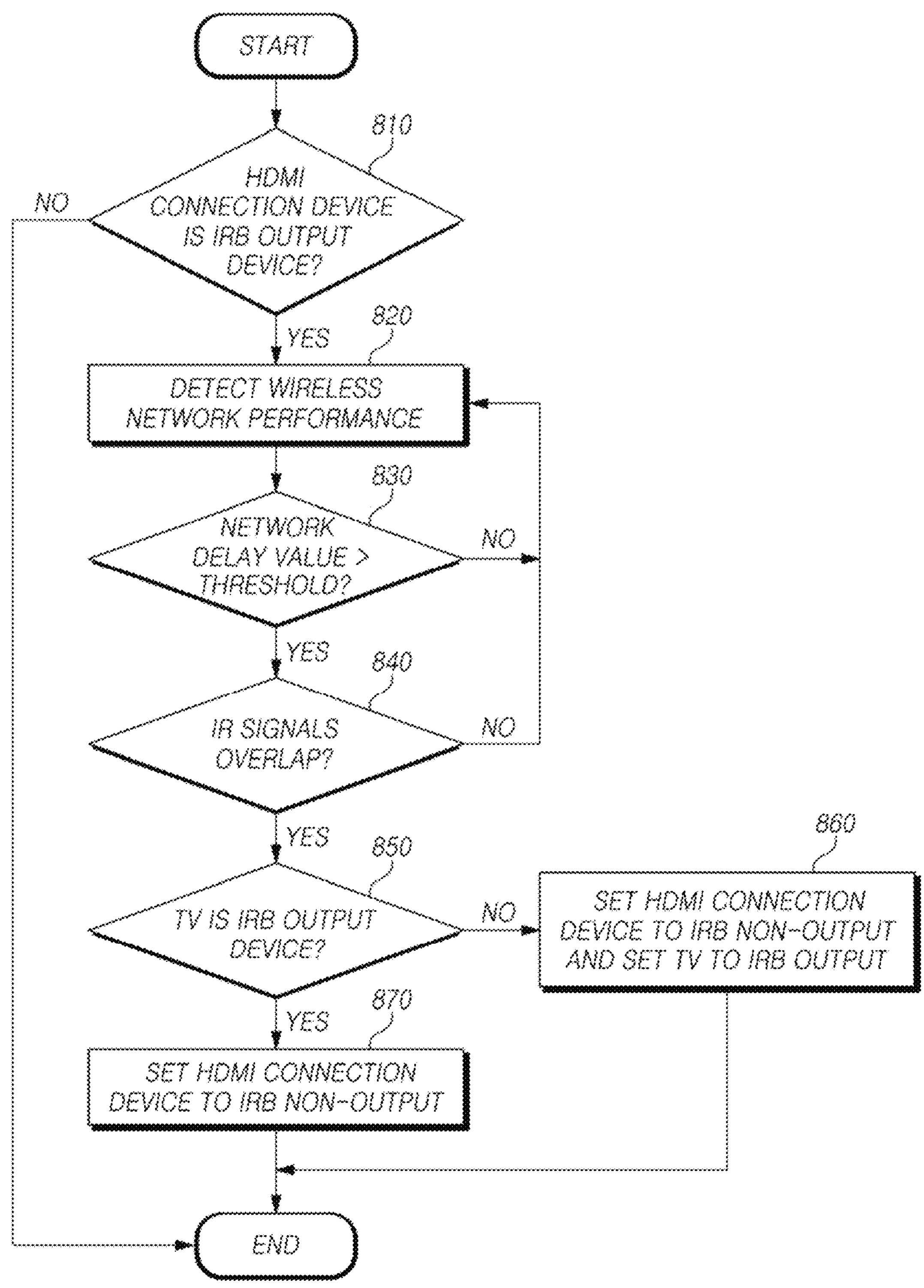
FIG. 8 is a flowchart illustrating an operation in which a display device changes an output device of a control signal (e.g., an IR signal) of a source device according to the occurrence of a real-time wireless network delay, according to an embodiment of the disclosure.

FIG. 8 is a flowchart illustrating an operation in which a display device changes an output device of a control signal (IR signal) of a source device according to the occurrence of a real-time wireless network delay, according to an embodiment of the disclosure.

Referring to FIG. 8, the display device (e.g., the display device 101 of FIG. 1 or a TV) may perform method to re-determine which device (e.g., the display device 101 or the HDMI connection device (e.g., the HDMI connection device 102 of FIG. 1)) is to transmit the command received from the TV controller (e.g., the TV controller 104 of FIG. 1) as an IR signal when a wireless network delay occurs. Each operation of the method may be sequentially performed, but may not be necessarily performed sequentially. For example, the order of the operations may be changed, and at least two (2) operations may be performed in parallel.

In operation 810, the display device 101, according to an embodiment, may determine whether the HDMI connection device 102 is an IRB output device. When the HDMI connection device 102 is not an IRB output device, there is no need to consider the wireless network delay, and thus the operation of monitoring the wireless network delay in real-time may be terminated.

In operation 820, the display device 101, according to an embodiment, may detect wireless network performance in response to determining that the HDMI connection device 102 is an IRB output device. The wireless network may represent wireless communication between the display device 101 and the HDMI connection device 102, and may be and/or may include, for example, Wi-Fi communications. For example, the display device 101 may detect wireless network performance using an index (e.g., Wi-Fi speed) that monitors wireless communication performance.

In operation 830, the display device 101, according to an embodiment, may determine whether the wireless network delay value is larger than a determined threshold. The method of FIG. 8 may return to operation 820 when the wireless network delay value is not larger than the determined threshold (NO in operation 830). Otherwise, the method of FIG. 8 may proceed to operation 840 (YES in operation 830).

In operation 840, the display device 101, according to an embodiment, may determine whether the two IR signals transmitted by the display device 101 and the HDMI connection device 102 overlap according to the wireless network delay value in response to determining that the wireless network delay value is larger than the determined threshold. For example, the display device 101 may determine whether the IR signals overlap by predicting the control signal graph of FIG. 7. The method may return to operation 820 when the IR signals do not overlap (NO in operation 840). Otherwise, the method may proceed to operation 850 (YES in operation 840).

In operation 850, the display device 101, according to an embodiment, may determine whether the TV 101 is an IRB output device in response to determining that two IR signals transmitted from the display device 101 and the HDMI connection device 102 overlap.

In operation 860, the display device 101, according to an embodiment, may set an IRB non-output in the HDMI connection device in response to identifying that the two IR signals transmitted from the display device 101 and the HDMI connection device 102 overlap and the TV 101 is an IRB output device (NO in operation 850). That is, the display device 101 may set only itself as an IR signal output device, and exclude the HDMI connection device 102 from the output devices. In an embodiment, the display device 101 may not transmit an HDMI command to the HDMI connection device 102. In such a case, as only the IR signal is output from the HDMI connection device 102, there may be a high likelihood that the signal from the TV controller may be delayed due to wireless network latency when passing through the HDMI connection device 102. Consequently, the TV 101 may be reset to output the IR signal instead of the HDMI connection device 102.

In operation 870, the display device 101, according to an embodiment, may exclude the TV 101 from the IR signal output devices and add the TV 101 to the IR signal output devices in response to identifying that the two IR signals transmitted from the display device 101 and the HDMI connection device 102 overlap and the TV 101 is not an IRB output device (YES in operation 850). The display device 101 may be configured to output an IR signal from the IRB of the TV without transmitting an HDMI command for the HDMI connection device 102. In this case, as both the TV 101 and the HDMI connection device 102 transmit IR signals, only the TV 101 may be reset to output the IR signal to prevent an overlap between the IR signals.

Figure 9:
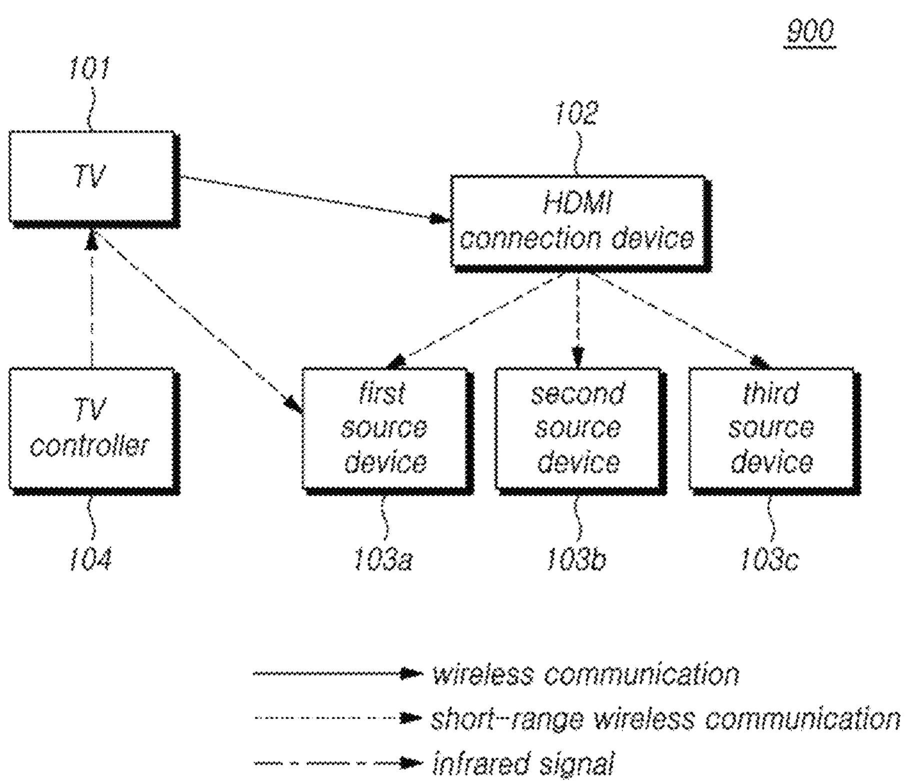
FIG. 9 illustrates a plurality of source devices connected to a display device, according to an embodiment of the disclosure.

FIG. 9 illustrates a plurality of source devices connected to a display device, according to an embodiment of the disclosure.

In the home network environment 900, according to an embodiment, the display device 101 and the plurality of source devices (e.g., a first source device 103*a*, a second source device 103*b*, and a third source device 103*c*) may be connected to each other. The display device 101 in the home network environment 900 may receive a control signal (e.g., an IR signal or a Bluetooth™ signal) generated by a user input from the TV controller 104. The display device 101 may be connected to the first source device 103*a*, the second source device 103*b*, and the third source device 103*c* through the HDMI connection device 102. The display device 101 may convert the control signal received from the TV controller 104 into an IR signal for the currently connected first source device (e.g., the set-top box 103*a*) and transmit the same.

The display device 101 may transmit and/or receive data from one source device (e.g., the first source device 103*a*) at a time. For example, the display device 101 may be connected to the set-top box 103*a*, the Blu-ray disc player 103*b*, and the game console 103*c*, and during data transmission and/or reception with the set-top box 103*a*, the connection with the other devices (e.g., Blu-ray disc player 103*b*, game console 103*c*) may be in the standby state. The display device 101 may identify the source device (e.g., the set-top box 103*a*) that is currently transmitting and/or receiving data among the plurality of connected source devices 103.

The display device 101 may generate and transfer, to the HDMI connection device 102, an HDMI command including the control signal received from the TV controller 104 and information about the first source device 103*a*. The HDMI connection device 102 may generate and/or transmit an IR signal for the first source device 103*a* based on the received HMDI command. The IRB transmitter of the HDMI connection device 102 may output an IR signal without specifying a reception target to be detected by the IRB receiver within the IR signal arrival range. The first source device 103*a*, the second source device 103*b*, and the third source device 103*c* may receive the IR signals transmitted by the display device 101 and the HDMI connection device 102. The first source device 103*a* may receive the IR signal based on the IR signal including information about the target device.

Figure 10:
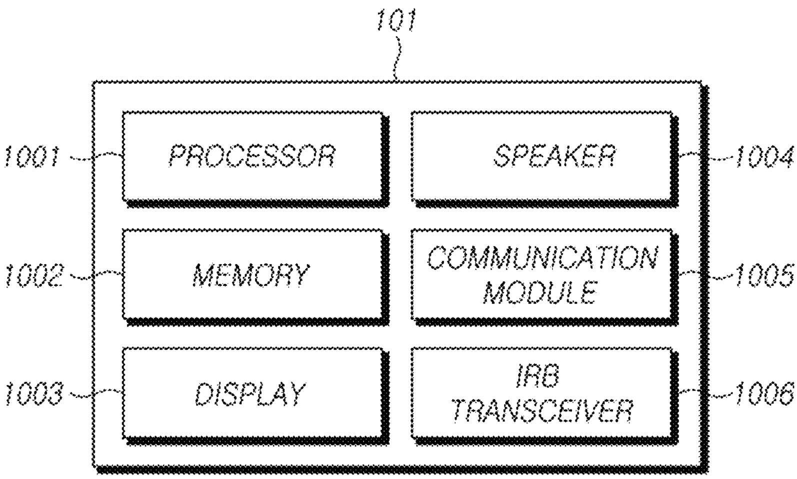
FIG. 10 is a block diagram illustrating a display device, according to an embodiment of the disclosure.

FIG. 10 is a block diagram illustrating a display device, according to an embodiment of the disclosure.

According to an embodiment, the display device 101 may include a processor 1001, memory 1002, a display 1003, a speaker 1004, a microphone 1005, a communication module 1006, an IRB transceiver 1007, and a BT transceiver 1008.

The processor 1001 may execute, for example, software (e.g., a program 140) to control at least one other component (e.g., a hardware or software component) of the display device 101 coupled with the processor 1001, and may perform various data processing or computation. According to one embodiment, as at least part of the data processing or computation, the processor 1001 may load a command or data received from another component (e.g., communication module 1006) onto a volatile memory, process the command or the data stored in the volatile memory, and store resulting data in a non-volatile memory. According to an embodiment, the processor 1001 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor.

The memory 1002 may store various data used by at least one component (e.g., the processor 1001 or the communication module 1006) of the display device 101. The data may include, e.g., input data or output data for software (e.g., program) and related commands. The memory 1002 may include volatile memory or nonvolatile memory.

The program may be stored, as software, in the memory 130 and may include, e.g., an operating system (OS), middleware, or an application.

The display 1003 may visually provide information to the outside (e.g., the user). The display 1003 may include a touch sensor configured to detect a touch, or a pressure sensor configured to measure the intensity of a force generated by the touch.

The speaker 1004 may be and/or may include a device that outputs sound, and may output the audio signal received from the source device.

The communication module 1006 may support establishing a direct (e.g., wired) communication channel and/or a wireless communication channel between the display device 101 and the external electronic device (e.g., an HDMI connection device (e.g., the HMDI connection device 102 of FIG. 1), a TV controller (e.g. the TV controller 104 of FIG. 1), or a source device (e.g., the source device 103 of FIG. 1)) and perform communication via the established communication channel. The communication module 1006 may include one or more communication processors that may be independently operable from the processor 1001 (e.g., the application processor (AP)) and/or may support a direct (e.g., wired) communication and/or a wireless communication. According to an embodiment, the communication module 1006 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of the communication modules may communicate with the external electronic device 102 via a first network (e.g., a short-range communication network, such as, but not limited to, Bluetooth™, Wi-Fi direct, or infrared data association (IrDA)) or a second network (e.g., a long-range communication network, such as a legacy cellular network, a fifth generation (5G) cellular network, a next-generation communication network, the Internet, or a computer network (e.g., local area network (LAN) or wide area network (WAN)). These various types of communication modules may be implemented as a single component (e.g., a single chip), and/or may be implemented as multi components (e.g., multi chips) separate from each other.

The communication module 1006 may include one or more wireless communication circuits, e.g., a control circuit for Wi-Fi wireless communication and a control circuit for Bluetooth™ wireless communication.

The IRB transceiver 1007 may be a separate control circuit for transmitting and/or receiving infrared signals among the communication modules 1006. The IRB transmission range and/or reception range of the IRB transceiver 1007 may be determined depending on the position where the IRB transceiver 1007 is disposed in the display device 101.

A display device, according to an embodiment of the disclosure, may include a display, a wireless communication circuit, an infrared signal transceiver, memory storing at least one program, and at least one processor electrically connected to the memory and executing the at least one instruction of the program stored in the memory. The at least one processor may detect, via the wireless communication circuit, a wireless connection to an HDMI connection device, wherein the HDMI connection device is connected to an external source device, in response to receiving a first infrared IR signal from the HDMI connection device 102 through the infrared signal transceiver within a determined wait time, calculate a first distance from the HDMI connection device 102 based on a time from a time point of the connection to the external source device to a time point of the reception of the first IR signal, in response to the first distance being included in a determined IR signal arrival range, set the infrared signal transceiver as an IR signal output device for the external source device, based on the first distance and wireless communication network performance, determine whether a second IR signal output from the infrared signal transceiver overlaps a third IR signal transmitted through the HDMI connection device, and in response to determining that the second IR signal does not overlap the third IR signal, set the HDMI connection device as the IR signal output device for the external source device.

According to an embodiment, the at least one processor may not set the infrared signal transceiver as the IR signal output device for the external source device but set the HDMI connection device 102 as the IR signal output device for the external source device in response to not receiving the first IR signal from the HDMI connection device through the infrared signal transceiver within the determined wait time.

According to an embodiment, the at least one processor may be configured to detect the connection to the external source device in response to receiving a request for the connection to the external source device from the HDMI connection device. The connection request may be automatically sent by the HDMI connection device 102 in response to the external source device being initially connected to the HDMI connection device through an HDMI wired cable.

According to an embodiment, the at least one processor may monitor the wireless communication network performance in real-time, and reset an IRB output device for the external source device in response to detecting that a wireless communication delay value according to the wireless communication network performance exceeds a determined threshold.

According to an embodiment, the at least one processor may re-determine whether the second IR signal overlaps the third IR signal by reflecting the wireless communication network delay value in response to determining to reset the IRB output device for the external source device, and set the HDMI connection device to be excluded from the IR signal output device for the external source device in response to determining that the second IR device overlaps the third IR device.

According to an embodiment, the at least one processor may set the infrared signal transceiver as the IR signal output device for the external source device in response to determining that the second IR device overlaps the third IR device.

A display device according to another embodiment of the disclosure may include a display, a wireless communication circuit, an infrared signal transceiver, memory storing at least one program, and at least one processor electrically connected to the memory and executing the at least one instruction of the program stored in the memory. The at least one processor may be configured to receive, via the wireless communication circuit, first content of a external source device connected to an HDMI connection device from the HDMI connection device, receive, via the wireless communication circuit or the infrared signal transceiver, a control command from the first controller while outputting the first content through the display, identify an IR signal output device for the external source device, and in response to identifying that the IR signal output device for the external source device may be the infrared signal transceiver, change the control command to an IR signal for the external source device and transmit, via the infrared signal transceiver, the IR signal.

According to an embodiment, the at least one processor may change the control command to the IR signal for the external source device by referring to a control command table for the external source device. The control command table may include information about an IR signal pattern corresponding to one or more control commands for the external source device.

According to an embodiment, the at least one processor may generate an HDMI command corresponding to the control command and transmit, via the wireless communication circuit, the HDMI command to the HDMI connection device in response to identifying that the IR signal output device for the external source device is the HDMI connection device.

According to an embodiment, the at least one processor may generate the HDMI command by referring to a first table for the first controller in response to receiving the control command from the first controller through the wireless communication circuit. The first table may include information about a wireless communication signal value corresponding to one or more control commands for the first controller.

According to an embodiment, the at least one processor may generate the HDMI command by referring to a second table for the first controller in response to receiving the control command from the first controller through the infrared signal transceiver. The second table may include information about an IR signal pattern corresponding to one or more control commands for the first controller.

Embodiments of the present disclosure and terms used therein may not be intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like. A module may be and/or may include a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While this invention has been described with reference to illustrative embodiments, this description is not intended to be construed in a limiting sense. Various modifications and combinations of the illustrative embodiments, as well as other embodiments of the invention, may be apparent to persons skilled in the art upon reference to the description. It is therefore intended that the appended claims encompass any such modifications or embodiments.

What is claimed is:

1. A display device, comprising:
a display;
a wireless communication circuit;
an infrared (IR) signal transceiver;
one or more processors comprising processing circuitry; and
memory storing at least one program,
wherein the at least one program, when executed by the one or more processors individually or collectively, causes the display device to:
detect, using the wireless communication circuit, a wireless connection to a high-definition multimedia interface (HDMI) connection device, the HDMI connection device being connected to an external source device;
based on receiving a first IR signal from the HDMI connection device through the IR signal transceiver within a predetermined wait time, determine a first distance to the HDMI connection device based on a time difference between a first time point corresponding to the wireless connection to the HDMI connection device and a second time point corresponding to reception of the first IR signal;
based on the first distance being within a predetermined IR signal arrival range, set the IR signal transceiver as an IR signal output device for the external source device;
based on the first distance and a performance of a wireless communication network, determine whether a second IR signal output by the IR signal transceiver at least partially overlaps a third IR signal transmitted through the HDMI connection device; and
based on determining that the second IR signal does not overlap the third IR signal, set the HDMI connection device as the IR signal output device for the external source device.

2. The display device of claim 1, wherein the at least one program, when executed by the one or more processors individually or collectively, further causes the display device to:
based on not receiving the first IR signal from the HDMI connection device within the predetermined wait time, prevent setting the IR signal transceiver as the IR signal output device for the external source device and set the HDMI connection device as the IR signal output device for the external source device.

3. The display device of claim 1, wherein the at least one program, when executed by the one or more processors individually or collectively, further causes the display device to:
detect a connection to the external source device based on receiving a connection request to the external source device from the HDMI connection device, the connection request having been sent by the HDMI connection device based on the external source device being connected to the HDMI connection device through an HDMI cable.

4. The display device of claim 1, wherein the at least one program, when executed by the one or more processors individually or collectively, further causes the display device to:
monitor performance of the wireless communication network;
determine a wireless communication delay value based on the performance of the wireless communication network; and
reset an IR blaster (IRB) output device for the external source device based on a determination that the wireless communication delay value exceeds a determined threshold.

5. The display device of claim 4, wherein the at least one program, when executed by the one or more processors individually or collectively, further causes the display device to:
based on determining to reset the IRB output device for the external source device, re-determine whether the second IR signal at least partially overlaps the third IR signal according to the wireless communication delay value; and
exclude the HDMI connection device from the IR signal output device for the external source device based on determining that the second IR signal at least partially overlaps the third IR signal.

6. The display device of claim 5, wherein the at least one program, when executed by the one or more processors individually or collectively, further causes the display device to:
set the IR signal transceiver as the IR signal output device for the external source device based on determining that the second IR signal at least partially overlaps the third IR signal.

7. A display device, comprising:
a display;
a wireless communication circuit;
an infrared (IR) signal transceiver;
one or more processors comprising processing circuitry; and
memory storing at least one program,
wherein the at least one program, when executed by the one or more processors individually or collectively, causes the display device to:
receive, from a high-definition multimedia interface (HDMI) connection device via the wireless communication circuit, content of an external source device connected to the HDMI connection device;
receive, via at least one of the wireless communication circuit or the IR signal transceiver, a control command from a first controller while outputting the content using the display;
identify an IR signal output device for the external source device; and
based on identifying the IR signal transceiver as the IR signal output device for the external source device, change the control command to an IR signal for the external source device and transmit, via the IR signal transceiver, the IR signal comprising the control command.

8. The display device of claim 7, wherein the at least one program, when executed by the one or more processors individually or collectively, further causes the display device to:

change the control command to the IR signal for the external source device by accessing a control command table for the external source device, the control command table comprising IR signal pattern information corresponding to one or more control commands for the external source device.

9. The display device of claim 7, wherein the at least one program, when executed by the one or more processors individually or collectively, further causes the display device to:

based on identifying the HDMI connection device as the IR signal output device for the external source device, generate an HDMI command corresponding to the control command, and transmit, via the wireless communication circuit, the HDMI command to the HDMI connection device.

10. The display device of claim 9, wherein the at least one program, when executed by the one or more processors individually or collectively, further causes the display device to:

based on receiving the control command from the first controller through the wireless communication circuit, generate the HDMI command by accessing a first table for the first controller, the first table comprising wireless communication signal values corresponding to one or more control commands for the first controller.

11. The display device of claim 9, wherein the at least one program, when executed by the one or more processors individually or collectively, further causes the display device to:

generate the HDMI command by accessing a second table for the first controller based on receiving the control command from the first controller through the IR signal transceiver, the second table comprising IR signal pattern information corresponding to one or more control commands for the first controller.

12. A method of a display device, the method comprising:

detecting, using a wireless communication circuit of the display device, a wireless connection to a high-definition multimedia interface (HDMI) connection device, the HDMI connection device being connected to an external source device;

determining whether a first infrared (IR) signal is received, from the external source device through an IR signal transceiver of the display device, within a predetermined wait time;

based on determining that the first IR signal has been received within the predetermined wait time, determining a first distance to the HDMI connection device based on a time difference between a first time point corresponding to the wireless connection to the HDMI connection device and a second time point corresponding to reception of the first IR signal;

based on the first distance being within a determined IR signal arrival range, setting the IR signal transceiver as an IR signal output device for the external source device;

based on the first distance and a network performance of the wireless communication circuit, determining whether a second IR signal output by the IR signal transceiver at least partially overlaps a third IR signal transmitted through the HDMI connection device; and based on determining that the second IR signal does not overlap the third IR signal, setting the HDMI connection device as the IR signal output device for the external source device.

13. The method of claim 12, further comprising:

based on not receiving the first IR signal from the HDMI connection device within the predetermined wait time, preventing setting the IR signal transceiver as the IR signal output device for the external source device and setting the HDMI connection device as the IR signal output device for the external source device.

14. The method of claim 12, further comprising:

monitoring performance of a wireless communication network;

determining a wireless communication delay value based on the performance of the wireless communication network; and resetting an IR blaster (IRB) output device for the external source device based on determining that the wireless communication delay value exceeds a determined threshold.

15. The method of claim 14, wherein the resetting of the IRB output device for the external source device comprises:

re-determining whether the second IR signal at least partially overlaps the third IR signal according the wireless communication delay value; and excluding the HDMI connection device from the IR signal output device for the external source device based on determining that the second IR signal at least partially overlaps the third IR signal.

16. The method of claim 15, further comprising:

setting the IR signal transceiver as the IR signal output device for the external source device based on determining that the second IR signal at least partially overlaps the third IR signal.

17. The method of claim 12, further comprising:

receiving content of the external source device from the HDMI connection device through the wireless communication circuit;

receiving a control command from a first controller through at least one of the wireless communication circuit or the IR signal transceiver while outputting the content of the external source device using a display of the display device;

identifying the IR signal output device for the external source device; and based on identifying the IR signal transceiver as the IR signal output device for the external source device, changing the control command to an IR signal for the external source device, and transmitting, to the external source device through the IR signal transceiver, the IR signal comprising the control command.

18. The method of claim 17, wherein the changing of the control command to the IR signal for the external source device comprises changing the control command to the IR signal for the external source device by accessing a control command table for the external source device, and wherein the control command table comprises IR signal pattern information corresponding to one or more control commands for the external source device.

19. The method of claim 17, further comprising:

based on identifying the HDMI connection device as the IR signal output device for the external source device, generating an HDMI command corresponding to the control command and transmitting the HDMI command to the HDMI connection device through the wireless communication circuit.

20. The method of claim 19, wherein the generating of the HDMI command corresponding to the control command comprises:

generating the HDMI command by accessing a table for the first controller based on receiving the control command from the first controller through the wireless communication circuit, and wherein the table comprises wireless communication signal values corresponding to one or more control commands for the first controller.

* * * * *